(12) United States Patent
Joshi et al.

(10) Patent No.: US 8,825,661 B2
(45) Date of Patent: Sep. 2, 2014

(54) SYSTEMS AND METHODS FOR TWO STREAM INDEXING OF AUDIO CONTENT

(75) Inventors: Anupam Joshi, New Delhi (IN); Sougata Mukherjea, New Delhi (IN); Nitendra Rajput, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 12/956,625

(22) Filed: Nov. 30, 2010

(65) Prior Publication Data

US 2012/0136870 A1 May 31, 2012

(51) Int. Cl.
*G06F 7/00* (2006.01)
*G06F 17/30* (2006.01)

(52) U.S. Cl.
USPC .......................................... 707/741; 707/802

(58) Field of Classification Search
USPC ....................................................... 707/741
See application file for complete search history.

(56) References Cited

U.S. PATENT DOCUMENTS

| | | | |
|---|---|---|---|
| 6,185,527 B1 | 2/2001 | Petkovic et al. | |
| 6,243,676 B1 | 6/2001 | Witteman | |
| 7,027,987 B1 | 4/2006 | Franz et al. | |
| 7,668,721 B2 | 2/2010 | Barkley et al. | |
| 7,693,872 B2 | 4/2010 | Gorodyansky et al. | |
| 7,742,922 B2 | 6/2010 | Goller et al. | |
| 7,752,186 B2 | 7/2010 | Abajian | |
| 2001/0056479 A1 | 12/2001 | Miyayama et al. | |
| 2006/0248062 A1* | 11/2006 | Libes et al. | 707/3 |
| 2009/0063279 A1* | 3/2009 | Ives et al. | 705/14 |
| 2009/0138262 A1 | 5/2009 | Agarwal et al. | |
| 2009/0232287 A1* | 9/2009 | Agarwal et al. | 379/93.14 |
| 2010/0223259 A1* | 9/2010 | Mizrahi | 707/723 |
| 2011/0029504 A1* | 2/2011 | King et al. | 707/709 |

OTHER PUBLICATIONS

Leath, Ted, "Audient: An Acoustic Search Engine", Research Plan, University of Ulster, Magee, Londonderry, available at URL:http://audient.infm.ulst.ac.uk/assets/leath100.doc, as of Jul. 30, 2010.

Kontothanassis et al., "Design, Implementation, and Analysis of a Multimedia Indexing and Delivery Server", Cambridge Research Laboratory, Technical Report Series, Aug. 1999, available at URL: http://www.hpl.hp.com/techreports/Compaq-DEC/CRL-99-5.pdf, as of Jul. 30, 2010.

Quackenbush et al., "Overview of MPEG-7 Audio", IEEE Transactions on Circuits and Systems for Video Technology, vol. 11, No. 6, Jun. 1001, pp. 725-729.

Logan et al., "Real-World Audio Indexing Systems", Proceedings of IEEE International Conference on Acoustics, Speech, and Signal Processing 2005 (ICASSP '05), vol. 5, pp. v/1001-04, Mar. 2005.

(Continued)

*Primary Examiner* — Kuen Lu
(74) *Attorney, Agent, or Firm* — Ference & Associates LLC

(57) ABSTRACT

Systems and methods provide for indexing audio content by fusing the indexes derived from a keyword stream and a large vocabulary stream search. For example, systems and methods provide for two stream searching of Spoken Web VoiceSites, wherein metadata is extracted from the VoiceSite and is used to determine a set of keywords for high precision search while a traditional standard vocabulary set is used to perform a high results, low precision search. The results of the keyword search and the standard vocabulary search are fused together to form a comprehensive, ranked list of results.

23 Claims, 5 Drawing Sheets

(56) References Cited

OTHER PUBLICATIONS

Glass et al., "Recent Progress in the MIT Spoken Lecture Processing Project", Interspeech 2007, pp. 2553-2556, Aug. 2007, available at URL: http://people.csail.mit.edu/jrg/2007/glass-interspeech07.pdf.

Thong et al., "SpeechBot: a Speech Recognition based Audio Indexing System for the Web", Cambridge Research Laboratory, Technical Report Services, Jul. 2001, available at URL:http://www.hpl.hp.com/techreports/compaq-DEC/CRZ-2001_6/pnf, as of Jul. 30, 2010.

Johnson, S.E., et al., "A Method for Direct Audio Search with Applications to Indexing and Retrievel," Proceedings of the 2000 IEEE International Conference on Acoustics, Speech, and Signal Processing. ICASSP '00, 2000, pp. 1-4, IEEE, Washington, D.C., USA.

Kennedy, Lyndon S., et al., "Automatic Discovery of Query-Class-Dependent Models for Multimodal Search," Proceedings of the 13th Annual ACM International Conference on Multimedia, MM '05, Singapore, Nov. 6-11, 2005, 10 pages, ACM New York, New York, USA.

\* cited by examiner

SYSTEMS AND METHODS FOR TWO STREAM INDEXING OF AUDIO CONTENT

BACKGROUND

The creation of audio content continues to evolve for use in new applications. One such application is the World Wide Telecom Web (WWTW), also referred to as the 'Telecom Web' or the 'Spoken Web.' The Spoken Web is a network of VoiceSites hosted on the telecom network, wherein each voice site individually comprises a voice driven application. The Spoken Web system may be viewed as a telecom network parallel to the World Wide Web (WWW) that runs on the Internet infrastructure. VoiceSites are accessed by calling the number associated with the VoiceSite, called a VoiNumber. A VoiLink is used to link the various VoiceSites to one another. A VoiceSite may be created or updated through a voice driven interface, such that a user may create a VoiceSite or modify an existing VoiceSite using a cellular phone. The Spoken Web is an ideal solution for a large part of the world were the population does not have access to the devices necessary to access the Internet, but cellular phone penetration is high. As a result, the use of the Spoken Web and the number of VoiceSites continue to increase. Thus, the volume of audio content associated with the Spoken Web continues to steadily expand.

BRIEF SUMMARY

Systems and associated methods for indexing audio content are described. Systems and methods provide for indexing audio content by fusing the indexes derived from a keyword stream and a large vocabulary stream search. Embodiments provide for two stream searching of Spoken Web VoiceSites, wherein metadata is extracted from the VoiceSite and is used to determine a set of keywords for high precision search while a traditional standard vocabulary set is used to perform a high results, low precision search. Embodiments provide that the keyword search results and the standard vocabulary search results are fused together to form a comprehensive index of search results.

In summary, one aspect provides a method comprising: receiving audio content; generating at least one standard index by performing at least one standard speech recognition analysis on the audio content; generating at least one keyword index by performing at least one keyword speech recognition analysis on the audio content; and storing the at least one standard index and the at least one keyword index.

Another aspect provides a system comprising: at least one processor; and a memory operatively connected to the at least one processor; wherein, responsive to execution of computer readable program code accessible to the at least one processor, the at least one processors is configured to: receive audio content; generate at least one standard index by performing at least one standard speech recognition analysis on the audio content; generate at least one keyword index by performing at least one keyword speech recognition analysis on the audio content; and store the at least one standard index and the at least one keyword index.

A further aspect provides a computer program product comprising: a computer readable storage medium having computer readable program code embodied therewith, the computer readable program code comprising: computer readable program code configured to receive audio content; computer readable program code configured to generate at least one standard index by performing at least one standard speech recognition analysis on the audio content; computer readable program code configured to generate at least one keyword index by performing at least one keyword speech recognition analysis on the audio content; and computer readable program code configured to store the at least one standard index and the at least one keyword index.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
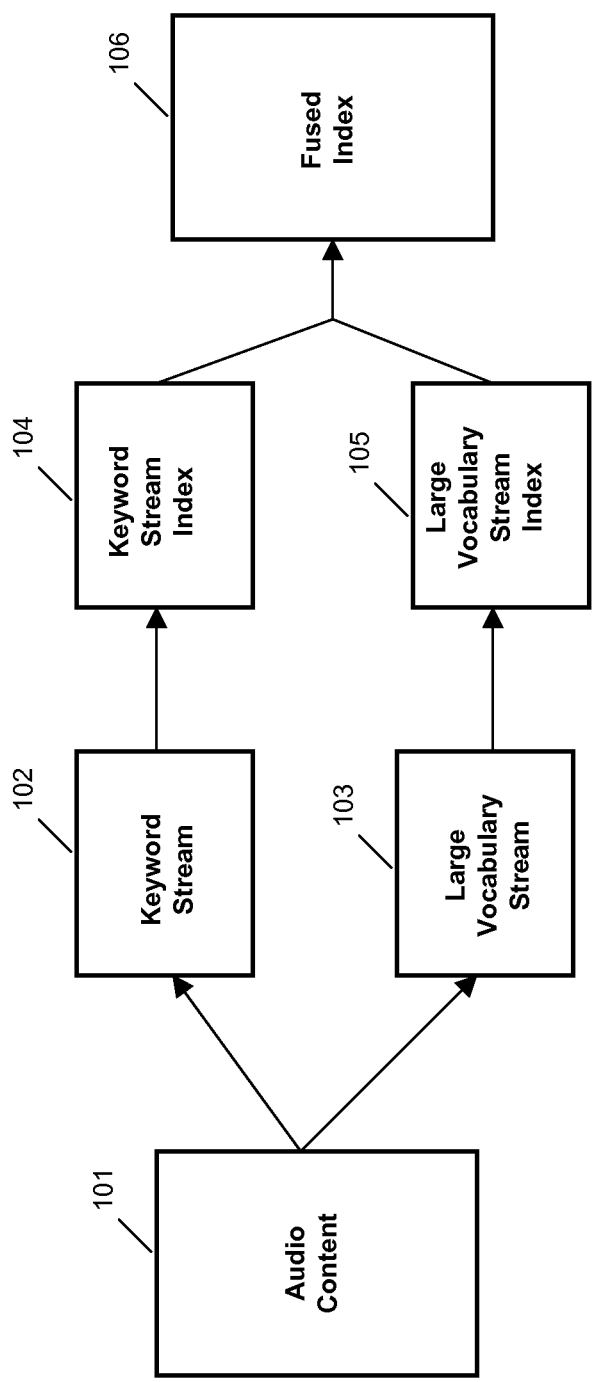
FIG. 1 illustrates an example embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

The volume of audio content continues to steadily expand. For example, the Spoken Web currently consists of a large number of VoiceSites. The number and the amount of data associated with these sites appears poised to increase much further. VoiceSite audio content is difficult to index because it is often spontaneous noisy audio in very different accents and languages. However, certain contextual information may be obtained for a VoiceSite to promote Spoken Web site indexing. The contextual information may include data regarding the actual content of the site and the locality of users accessing the site. Existing technology mostly comprises standard search methods involving converting speech to text, and then indexing on that text. These methods provide only a very limited precision recall and do not take into account other factors, such as information context. Certain recent methods have attempted to incorporate audio content into information search methods, but have not achieved effective indexing and searching of audio content, especially indexing and search based on site context.

One such method involves submitting an Internet search through voice and the presenting the search results on a web site. With this method, actual audio content is not searched, and the results cannot be accessed by voice. Another method concerns voice-based search for Internet data, wherein search results are provided as electronic mail to a user's cellular phone. However, this particular method does not use any other contextual information or text in the search, and does not search audio content specifically. A further method allows for the use of a cellular phone to place a search query on Internet text data. This search method does not use any contextual information or text. In addition, search results cannot be accessed by voice. An additional method comprises multimodal search over video and text data, using unimodal search performance to generate queries for multimodal search. This method, however, does not use any contextual information in performing the search. A still further method involves a technique for searching audio data to find an exact match for a given piece of cue-audio. This method is limited in that it searches only the audio dimension of a site and does not use any voice site contextual information.

The description now turns to the figures. The illustrated example embodiments will be best understood by reference to the figures. The following description is intended only by way of example and simply illustrates certain example embodiments representative of the invention, as claimed.

Embodiments index audio content through two-stream processing of the audio content. According to embodiments, the first stream is a keyword stream that identifies specific keywords for a particular domain of the audio content and searches for these specific keywords in the audio content. The identification of such keywords according to embodiments involves identifying metadata associated with the audio content and using an ontology or knowledge base on the metadata to obtain more keywords. Embodiments perform a high-threshold speech recognition using the limited vocabulary formed by the keywords. Embodiments provide that the second stream is a large vocabulary stream that involves standard speech-to-text large vocabulary speech recognition of the audio content, obtaining noisy, but rich, vocabulary data that can be used for content searches. As a non-limiting example, the large vocabulary stream may be comprised of a standard English language vocabulary set. The large vocabulary speech recognition may not necessarily provide word level output; however, it may provide sub-word level output. Embodiments provide that search results from the keyword stream and from the large vocabulary stream are independently ranked, and these rankings fused together to form a ranked list of the search results for the two-stream process.

Referring now to FIG. 1, therein is depicted an example embodiment. Audio content 101 is processed through a keyword stream 102 and a large vocabulary stream 103. Each stream generates word sequence results 104, 105. The keyword stream results 104 and the large vocabulary results 105 are combined together form the fused index 106.

According to embodiments, keywords for the keyword stream are determined by the particular domain of the audio content. The domain of the audio content may be ascertained according to embodiments by extracting metadata from the audio content. A Spoken Web voice site will serve as a non-limiting example of audio content for illustrating certain embodiments herein. According to embodiments, the domain of a Spoken Web voice site may be determined based on user data obtained from call records for users accessing the voice site. As a non-limiting example, information regarding users accessing the voice site may reveal the site language or demographic trends, such as the age, sex, or occupation of users accessing the site. Embodiments provide that metadata may be derived from the contents of the voice site. This content includes, but is not limited to, the voice site title, subject matter, and audio content, such as whether the voice site contains music or whether site content is provided by one person or a series of contributors. When the voice site is accessed may also provide metadata according to embodiments of the invention. In addition, embodiments may extract metadata pertaining to the site deployment location or the location where users are accessing the site.

Embodiments provide that extracted metadata may be used to determine keywords for the keyword stream. Ontologies and knowledge bases provide non-limiting examples of resources that are used to determine keywords from metadata. A non-limiting example of determining keywords from metadata for a particular site involves a voice site that is accessed mainly during normal business hours. As such, the example site may be categorized, inter alia, as a business voice site. Accordingly, embodiments provide that certain keywords may be derived based on this information, including the keywords 'office,' 'work,' or 'salaries.' Another non-limiting example involves metadata based on the actual content of the voice site. In this example, the content of the metadata indicates that the voice site was deployed by an IT services company. Accordingly, embodiments provide that relevant keywords for the voice site may be 'software,' network, 'computer,' or 'information technology.'

Embodiments provide that the keyword stream searches the audio content of a voice site for keywords only, resulting in a high-threshold speech recognition on a limited vocabulary set. According to embodiments, the large vocabulary set performs speech recognition using standard large vocabulary sets, resulting in a high text output. As such, the keyword stream results have limited vocabulary but may be more accurate; while the large vocabulary stream will produce a larger result set but will have lower precision.

Figure 2:
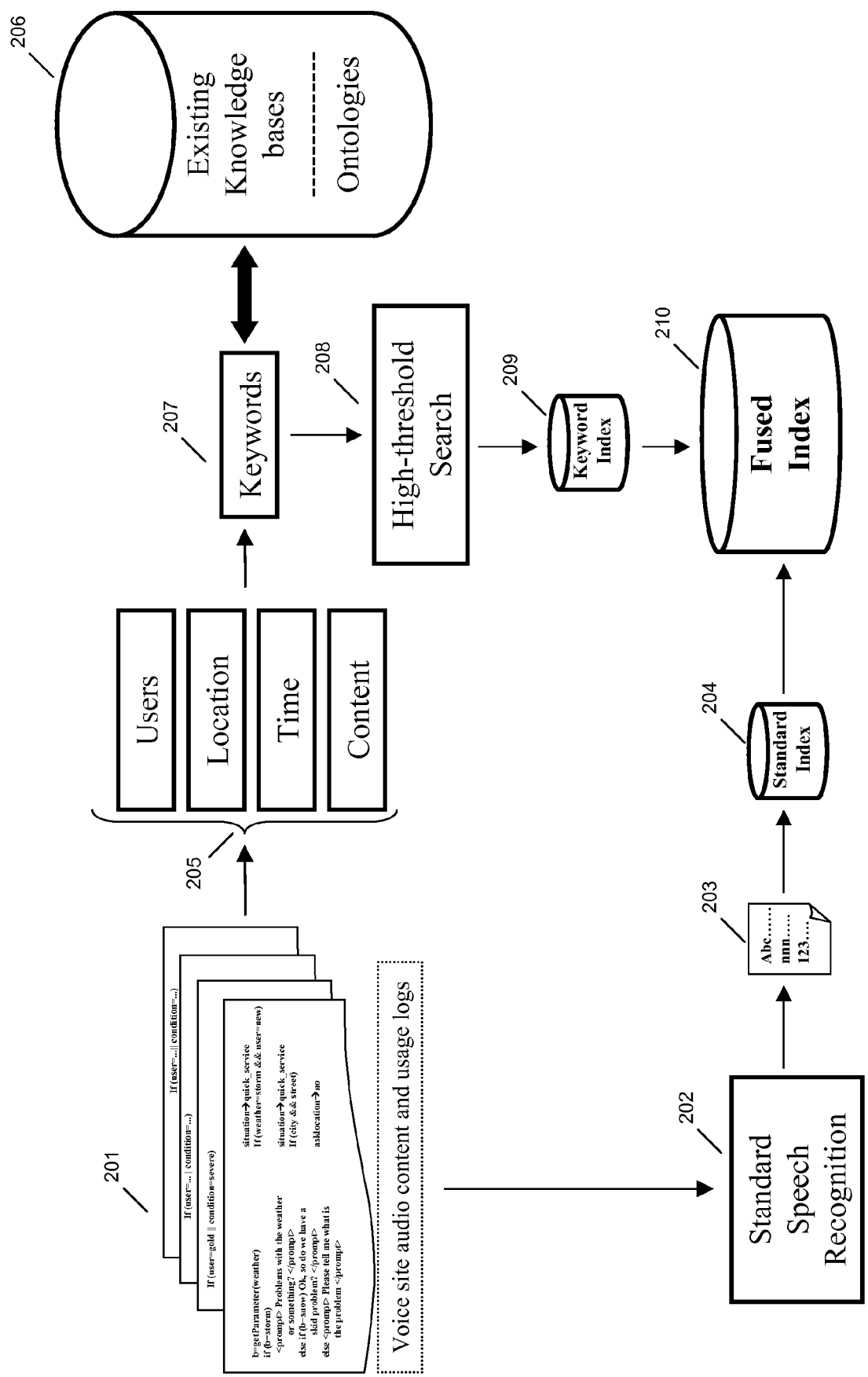
FIG. 2 illustrates an example of searching the audio content of a VoiceSite.

Referring now to FIG. 2, therein is depicted an example of indexing the audio content of a voice site. The audio content and usage logs from the voice site 201 are processed by a standard speech recognition system 202. The standard speech recognition system 202 converts the audio into a large amount of text 203, which will likely contain a significant amount of false matches. A standard index 204 is created out of the converted text 203. Metadata 205 is extracted from the audio content and usage logs of the voice site 201. The metadata 205 is processed 206, producing keywords 207 relevant to the metadata 205. A high-threshold speech recognition system 208 searches the audio content and usage logs of the voice site 201 for the keywords 207. A keyword index is created 209 and is fused together with the standard index 204 to create a fused index 210. In addition to the example illustrated in FIG. 2, embodiments provide that the keyword and standard indexes may be stored separately instead of being fused. In addition, embodiments provide that the individually stored keyword and standard indexes may be utilized to produce separate search results.

Figure 3:
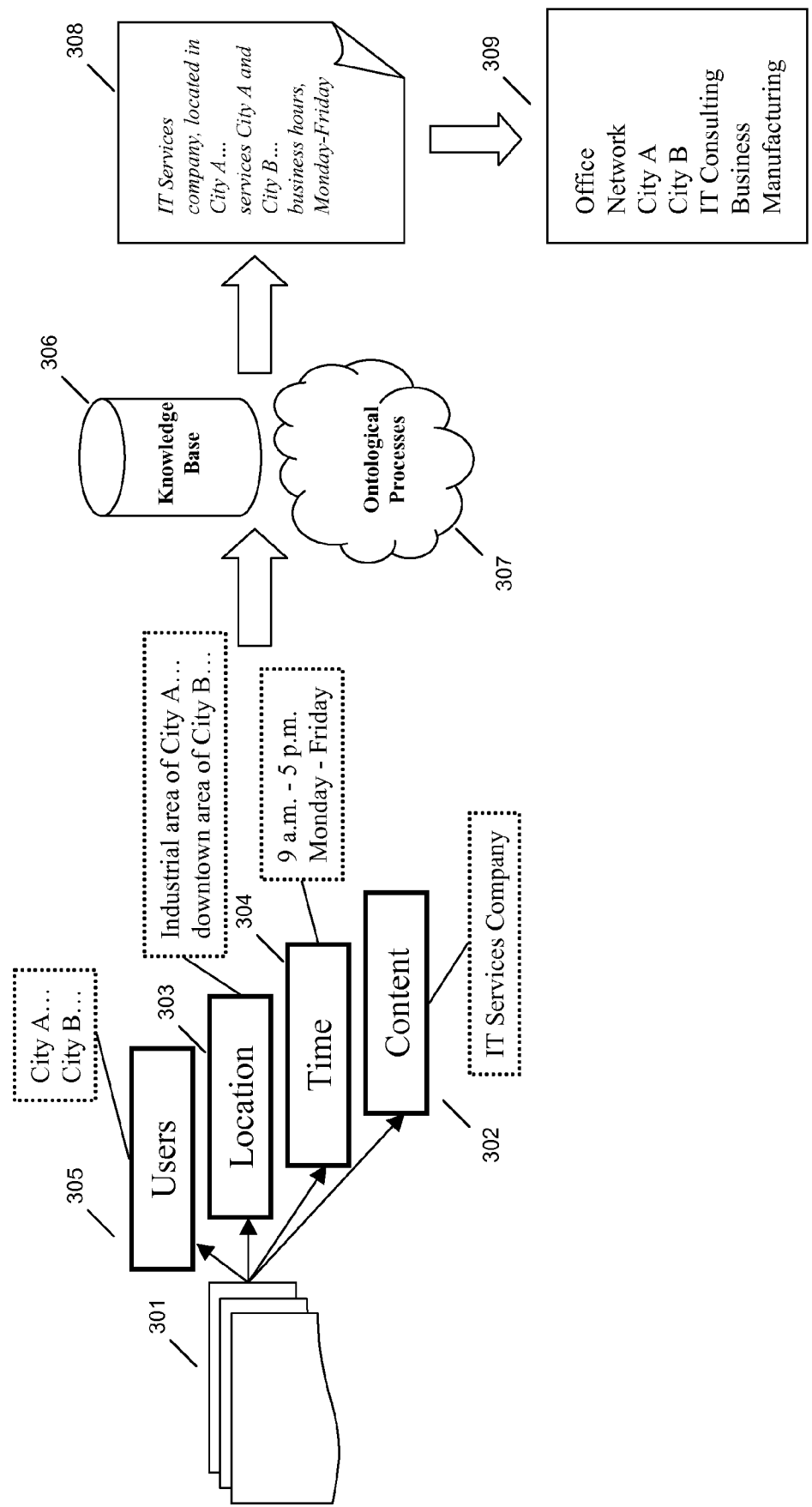
FIG. 3 illustrates an example of deriving keywords from metadata.

Referring now to FIG. 3, therein is depicted an example of deriving keywords from metadata for a particular Spoken Web VoiceSite. VoiceSite 301 metadata concerning the content 302, location 303, time 304, and users 305 is extracted. The content metadata 302 reveals that the VoiceSite 301 is for an IT services company and the location metadata 303 demonstrates that the VoiceSite 301 is deployed in City A and is accessed most frequently from the industrial area of City A and the downtown area of City B. The time metadata 304 shows that the VoiceSite 301 is accessed mainly during business hours Monday through Friday. The user metadata 305 demonstrates that the VoiceSite 301 is accessed mainly by cellular phones registered to companies located in City A and City B. The metadata is processed using knowledge bases 306 and ontological processes 307 to determine keywords 308 related to the metadata 302, 303, 304, 305. As non-limiting examples, the knowledge bases 306 and ontological processes 307 may determine that the VoiceSite involves an IT services company voice site for a company located in City A that services manufacturing facilities and office buildings in City A and City B during normal business hours, Monday through Friday 308. As such, examples of derived keywords 309 may include, but are not limited to, terms such as 'office,' 'network,' City A, 'City B,' 'IT consulting,' 'business,' and 'manufacturing.'

Embodiments store the indexes from the keyword stream and the large vocabulary stream and maintain a common pointer to the audio content. According to embodiments, for a given input query, the search results from both the keyword stream and the large vocabulary stream indexes are extracted and combined to generate a fused list of query results. Embodiments generate a fused list by creating a new ranking scheme for the fused list that is derived from the weights determined for the two individual streams. Embodiments also provide for generating a fused list by using the top few results from both the streams and presenting them alternately in the final ranked result.

The following provides non-limiting examples of fusing search results according to embodiments. If the top result for the keyword stream has a relevancy of 0.95, while the top result for the large vocabulary stream is 0.80, the keyword stream may be deemed to have achieved a better search result due to the relevancy score. In addition, the relevancy weights of the two streams may be used to generate a combined score when the keyword stream and large vocabulary stream are fused together. An alternative method for fusing search results may involve combining just the top few results from each stream. For example, the top five results from both the keyword and large vocabulary streams may be combined to create a list of the top ten search results. Another non-limiting example involves a situation wherein the user wants more search results at the expense of precision. In this scenario, more weight may be given to the more voluminous large vocabulary stream search results. Alternatively, if more precision is desired, more weight may be given to the keyword stream search results.

Figure 4:
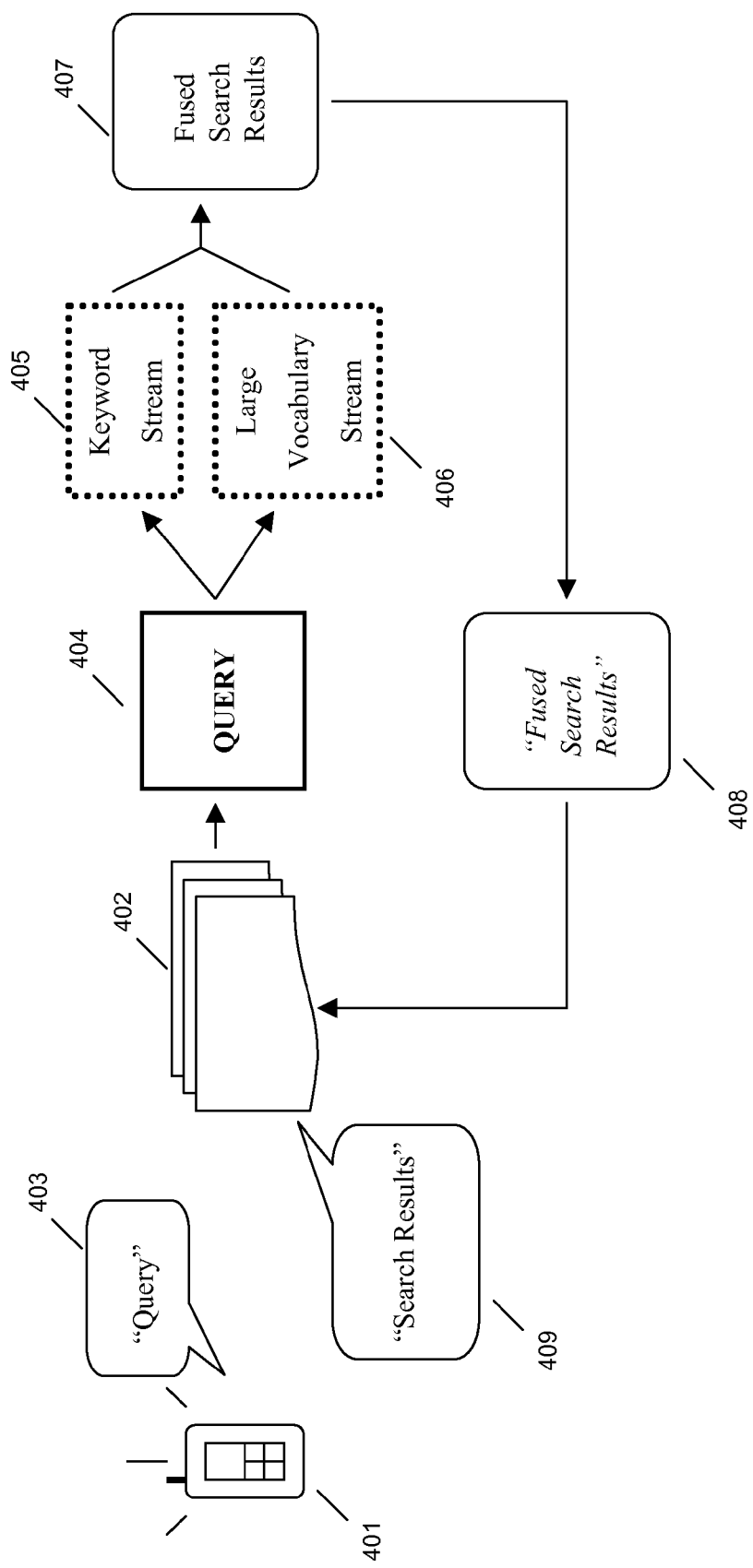
FIG. 4 illustrates an example of the processing of audio query submitted through a Spoken Web VoiceSite.

Referring now to FIG. 4, therein is depicted an example of the processing of audio query submitted through a Spoken Web VoiceSite. The user calls a search VoiceSite 402 using a cellular phone 401 and submits a spoken query 403 to the search VoiceSite 402. The spoken query 403 is converted to query text 404 and the search VoiceSite 402 processes the query using the query text 404. Keyword stream 405 and large vocabulary stream 406 searches are performed and their results fused 407 according to user search preferences. The fused results 407 are converted to audio search results 408 and are communicated to the user 409.

Figure 5:
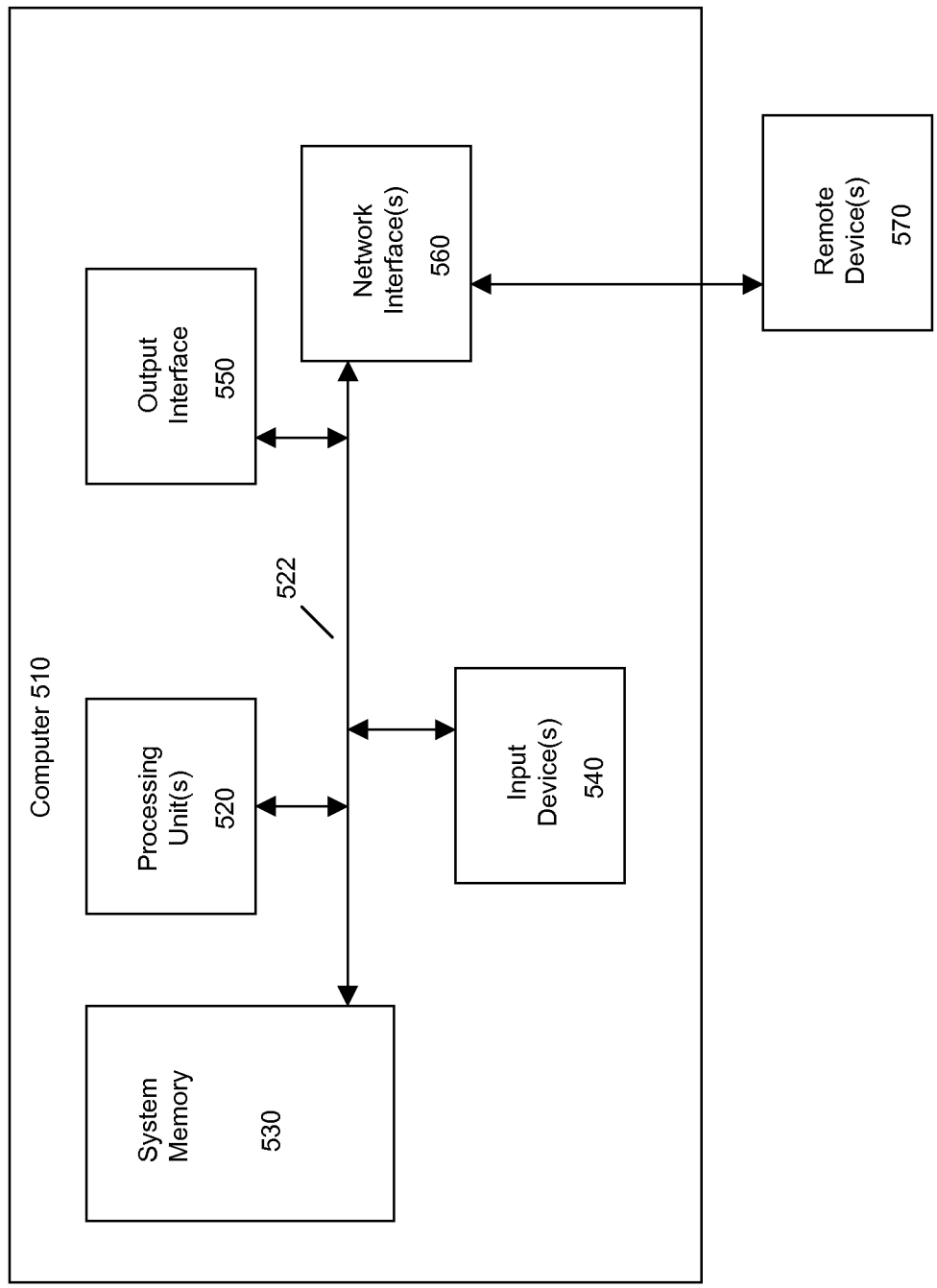
FIG. 5 illustrates an example computer system.

Referring to FIG. 5, it will be readily understood that certain embodiments can be implemented using any of a wide variety of devices or combinations of devices. An example device that may be used in implementing one or more embodiments includes a computing device in the form of a computer 510. In this regard, the computer 510 may execute program instructions configured to create a historical database, extract candidate information, enumerate relevant position features, rank candidates according to fitness score, and perform other functionality of the embodiments, as described herein.

Components of computer 510 may include, but are not limited to, a processing unit 520, a system memory 530, and a system bus 522 that couples various system components including the system memory 530 to the processing unit 520. The computer 510 may include or have access to a variety of computer readable media. The system memory 530 may include computer readable storage media in the form of volatile and/or nonvolatile memory such as read only memory (ROM) and/or random access memory (RAM). By way of example, and not limitation, system memory 530 may also include an operating system, application programs, other program modules, and program data.

A user can interface with (for example, enter commands and information) the computer 510 through input devices 540. A monitor or other type of device can also be connected to the system bus 522 via an interface, such as an output interface 550. In addition to a monitor, computers may also include other peripheral output devices. The computer 510 may operate in a networked or distributed environment using logical connections to one or more other remote computers or databases. The logical connections may include a network, such local area network (LAN) or a wide area network (WAN), but may also include other networks/buses.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any combination of one or more programming languages, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A method comprising:
   receiving audio content;
   generating at least one standard index by performing at least one standard speech recognition analysis on the audio content;
   generating at least one keyword index by performing at least one keyword speech recognition analysis on the audio content;
   storing the at least one standard index and the at least one keyword index;
   fusing the at least one standard index and the at least one keyword index together to form a comprehensive index;
   receiving at least one audio content query; and
   based on the at least one audio content query, performing a search with respect to the at least one standard index and the at least one keyword index.

2. The method according to claim 1, further comprising:
   said performing of a search comprising:
   obtaining at least one keyword query result by querying the at least one keyword index with the at least one audio content query; and
   obtaining at least one standard query result by querying the at least one standard index with the at least one audio content query;
   assigning at least one index weight to the at least one keyword query result and the at least one standard query result;
   generating a ranked keyword list based on the at least one keyword query result; and
   generating a ranked standard list based on the at least one standard query results.

3. The method according to claim 2, wherein fusing the at least one standard index and the at least one keyword index together to form a comprehensive index further comprises:
   fusing the ranked keyword list and the ranked standard list prioritized based on the at least one index weight.

4. The method according to claim 2, wherein fusing the at least one standard index and the at least one keyword index together to form a comprehensive index further comprises:
   fusing a top number of keyword query results from the ranked keyword list and a top number of standard query results from the ranked standard list.

5. The method according to claim 1, wherein the audio content is derived from a Spoken Web VoiceSite.

6. The method according to claim 1, wherein performing at least one keyword speech recognition analysis further comprises:
   extracting metadata from the audio content;
   processing the metadata to generate at least one keyword related to the audio content; and
   analyzing the audio content for the at least one keyword.

7. The method according to claim 6, wherein metadata is selected from at least one of the following metadata categories: content metadata category, time metadata category, users metadata category, and location metadata category.

8. The method according to claim 7, wherein the time metadata category comprises at least one time value representing when the audio content has been accessed.

9. The method according to claim 7, wherein the users metadata category comprises user information of at least one user who has accessed the audio content.

10. The method according to claim 6, wherein processing the metadata to generate at least one keyword comprises examining the metadata with at least one knowledge base.

11. The method according to claim 6, wherein processing the metadata to generate at least one keyword comprises examining the metadata with at least one ontology.

12. A system comprising:
at least one processor; and
a memory operatively connected to the at least one processor;
wherein, responsive to execution of computer readable program code accessible to the at least one processor, the at least one processor is configured to:
receive audio content;
generate at least one standard index by performing at least one standard speech recognition analysis on the audio content;
generate at least one keyword index by performing at least one keyword speech recognition analysis on the audio content;
store the at least one standard index and the at least one keyword index;
fuse the at least one standard index and the at least one keyword index together to form a comprehensive index;
receive at least one audio content query; and
based on the at least one audio content query, perform a search with respect to the at least one standard index and the at least one keyword index.

13. The system according to claim 12, wherein the at least one processor is configured to:
perform the search via:
obtaining at least one keyword query result by querying the at least one keyword index with the at least one audio content query; and
obtaining at least one standard query result by querying the at least one standard index with the at least one audio content query;
assign at least one index weight to the at least one keyword query result and the at least one standard query result;
generate a ranked keyword list based on the at least one keyword query result; and
generate a ranked standard list based on the at least one standard query result.

14. The system according to claim 13, wherein the at least one processor is configured to fuse the at least one standard index and the at least one keyword index together to form a comprehensive index via:
fusing the ranked keyword list and the ranked standard list prioritized based on the at least one index weight.

15. The system according to claim 13, wherein the at least one processor is configured to fuse the at least one standard index and the at least one keyword index together to form a comprehensive index via:
fusing a top number of keyword query results from the ranked keyword list and a top number of standard query results from the ranked standard list.

16. The system according to claim 12, wherein the audio content is derived from a Spoken Web VoiceSite.

17. The system according to claim 12, wherein the at least one processor is configured to perform at least one keyword speech recognition analysis via:
extracting metadata from the audio content;
processing the metadata to generate at least one keyword related to the audio content; and
analyzing the audio content for the at least one keyword.

18. The system according to claim 17, wherein metadata is selected from at least one of the following metadata categories: content metadata category, time metadata category, users metadata category, and location metadata category.

19. The system according to claim 18, wherein the time metadata category comprises at least one time value representing when the audio content has been accessed.

20. The system according to claim 18, wherein the users metadata category comprises user information of at least one user who has accessed the audio content.

21. The system according to claim 17, wherein the at least one processor is configured to process the metadata to generate at least one keyword via examining the metadata with at least one knowledge base.

22. The system according to claim 17, wherein the at least one processor is configured to process the metadata to generate at least one keyword via examining the metadata with at least one ontology.

23. A computer program product comprising:
a computer readable storage medium having computer readable program code embodied therewith, the computer readable program code comprising:
computer readable program code configured to receive audio content;
computer readable program code configured to generate at least one standard index by performing at least one standard speech recognition analysis on the audio content;
computer readable program code configured to generate at least one keyword index by performing at least one keyword speech recognition analysis on the audio content;
computer readable program code configured to store the at least one standard index and the at least one keyword index;
computer readable program code configured to fuse the at least one standard index and the at least one keyword index together to form a comprehensive index;
computer readable program code configured to receive at least one audio content query; and
computer readable program code configured, based on the at least one audio content query, to perform a search with respect to the at least one standard index and the at least one keyword index.

* * * * *